US010063513B2

(12) United States Patent
Owens et al.

(10) Patent No.: US 10,063,513 B2
(45) Date of Patent: Aug. 28, 2018

(54) DETERMINING TEMPORAL RELEVANCE OF NEWSFEED STORIES

(71) Applicant: Facebook, Inc., Menlo Park, CA (US)

(72) Inventors: Erich James Owens, Oakland, CA (US); David Vickrey, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 245 days.

(21) Appl. No.: 14/535,308

(22) Filed: Nov. 6, 2014

(65) Prior Publication Data
US 2016/0134577 A1 May 12, 2016

(51) Int. Cl.
*H04L 12/58* (2006.01)
*G06Q 50/00* (2012.01)
*G06F 17/30* (2006.01)
*H04L 29/08* (2006.01)

(52) U.S. Cl.
CPC ........ *H04L 51/32* (2013.01); *G06F 17/30867* (2013.01); *G06Q 50/01* (2013.01); *H04L 67/22* (2013.01)

(58) Field of Classification Search
None
See application file for complete search history.

(56) References Cited

U.S. PATENT DOCUMENTS

| | | | |
|---|---|---|---|
| 2008/0040474 A1* | 2/2008 | Zuckerberg ............ | G06Q 30/02 709/224 |
| 2008/0176655 A1* | 7/2008 | James ................. | G06F 19/3475 463/42 |
| 2008/0250031 A1* | 10/2008 | Ting .................. | G06F 17/30867 |
| 2012/0042012 A1* | 2/2012 | Darnell ............... | H04L 67/1095 709/203 |
| 2012/0089681 A1* | 4/2012 | Chowdhury ........ | H04L 12/6418 709/206 |
| 2012/0215846 A1* | 8/2012 | Howes .................. | G06Q 10/10 709/204 |
| 2013/0031034 A1* | 1/2013 | Gubin .............. | G06Q 10/06393 706/12 |
| 2013/0159110 A1* | 6/2013 | Rajaram ................ | G06Q 50/01 705/14.66 |
| 2013/0159885 A1* | 6/2013 | Yerli ...................... | G06Q 10/10 715/753 |
| 2013/0246521 A1* | 9/2013 | Schacht ................. | G06Q 50/01 709/204 |
| 2014/0067833 A1* | 3/2014 | Nandi ............... | G06F 17/30867 707/754 |
| 2014/0129942 A1* | 5/2014 | Rathod ............ | H04N 21/44222 715/720 |
| 2014/0337436 A1* | 11/2014 | Hoagland ......... | G06F 17/30867 709/204 |

* cited by examiner

*Primary Examiner* — Thomas J Dailey
(74) *Attorney, Agent, or Firm* — Fenwick & West LLP

(57) ABSTRACT

A social networking system generates stories based on actions of users in the system and provides a newsfeed to users that contain stories that related to one or more of their friends in the system. Although the story ranking algorithm includes a time decay to penalize older stories, stories may actually become stale at different rates. To measure the staleness of a story, the system computes a ratio of a current engagement rate for the story to an average engagement rate for the story. Based on this ratio, the system may filter out stale stories, includes the ratio as a feature in the scoring model, and/or adjust the decay rate.

18 Claims, 2 Drawing Sheets

DETERMINING TEMPORAL RELEVANCE OF NEWSFEED STORIES

BACKGROUND

A social networking system presents content to its users for consumption. The content presented to a given user is often generated by actions of other users in the system. Certain content may become stale over time thereby eventually losing its overall relevance in a current time period. A common approach to preventing stale content from being presented to users is to filter from presentation any content that was generated more than a static amount of time ago. The rate at which different types of content become stale, however, is not uniform. Therefore, such static filtering is not a broadly applicable mechanism for preventing stale content from being presented because the filter can be both over and under inclusive.

SUMMARY

To identify stale content, a social networking system processes current engagement levels between users of the social networking system and a story to generate a temporal relevance of the story. The temporal relevance of a story indicates a likelihood of the content of the story being relevant in a current time period. In operation, the social networking system determines the temporal relevance based on the ratio of an expected engagement for the story and the actual engagement for the story in the current time period. The temporal relevance provides insights into whether the story continues to be timely in the current time period (i.e., when the actual engagement is the same as or above the expected engagement) or whether the story is stale in the current time period (i.e., when the actual engagement is lower than the expected engagement). For example, the temporal relevance for a story including a half-time score of a basketball game may indicate that the engagement with the story in a current time period is significantly below the expected engagement for the story. This drop off in engagement computationally captures the notion that the half-time score of a sporting event becomes less and less temporally relevant as the game progresses and is largely irrelevant once the final score is decided. The social networking system may filter a story from being presented based on the temporal relevance, use the temporal relevance as a feature in a relevance scoring model, and/or adjust a rate at which the story loses relevance.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
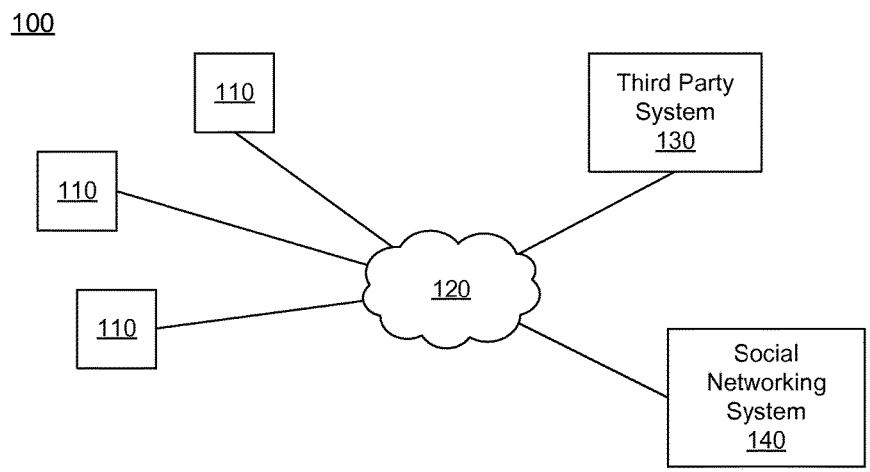
FIG. 1 is a block diagram of a system environment in which a social networking system operates, in accordance with an embodiment of the invention.

FIG. 1 is a high level block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the social networking system 140, such as advertisements, content, or information about an application provided by the third party website 130.

Figure 2:
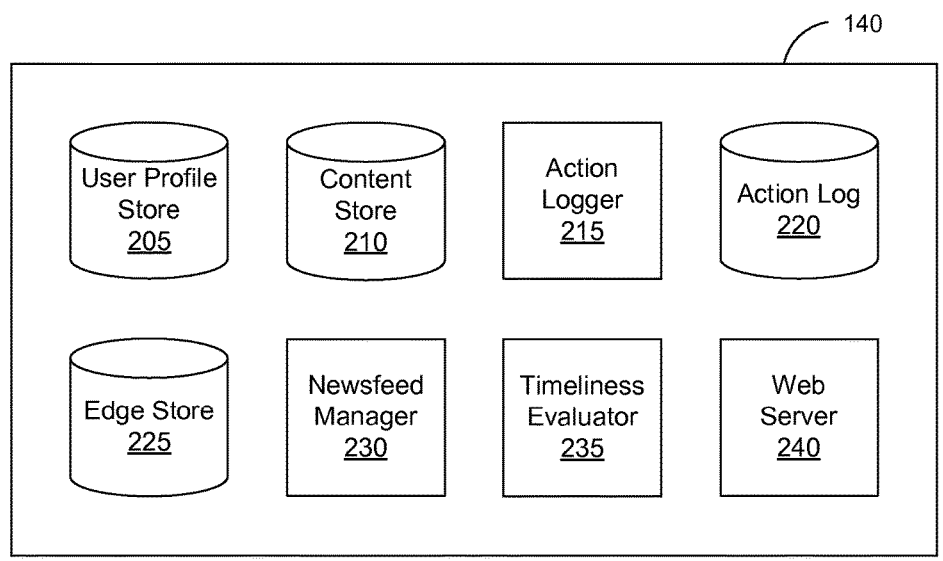
FIG. 2 is a block diagram of a social networking system, in accordance with an embodiment of the invention.

FIG. 2 is an example block diagram of an architecture of the social networking system 140. The social networking system 140 shown in FIG. 2 includes a user profile store 205, a content store 210, an action logger 215, an action log 220, an edge store 225, a newsfeed manager 230, a timeliness evaluator 235, and a web server 240. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding user of the social networking system 140. Examples of information stored in a user profile include biographic, demographic, and other types of descriptive information, such as work experience, educational history, gender, hobbies or preferences, location, and the like. A user profile may also store other information provided by the user, for example, images or videos. In certain embodiments, images of users may be tagged with identification information of users of the social networking system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the social networking system 140. In one embodiment, objects in the content store 210 represent single pieces of content, or content "items." Hence, users of the social networking system 140 are encouraged to communicate with each other by posting text and content items of various types of media through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions are stored in the action log 210. Examples of interactions with objects include: commenting on posts, sharing links, and checking-in to physical locations via a mobile device, accessing content items, and any other interactions. Additional examples of interactions with objects on the social networking system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website that primarily sells sporting equipment at bargain prices may recognize a user of a social networking system 140 through a social plug-in enabling the e-commerce website to identify the user of the social networking system 140. Because users of the social networking system 140 are uniquely identifiable, e-commerce websites, such as this sporting equipment retailer, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, an edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system, sharing a link with other users of the social networking system, and commenting on posts made by other users of the social networking system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's affinity for an object, interest, and other users in the social networking system 140 based on the actions performed by the user. A user's affinity may be computed by the social networking system 140 over time to approximate a user's affinity for an object, interest, and other users in the social networking system 140 based on the actions performed by the user. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The web server 240 links the social networking system 140 via the network 120 to the one or more client devices 110, as well as to the one or more third party systems 130. The web server 140 serves web pages, as well as other web-related content, such as JAVA®, FLASH®, XML and so forth. The web server 240 may receive and route messages between the social networking system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or RIM®.

The social networking system 140 identifies stories likely to be of interest to a user to be provided through a "newsfeed" presented to the user. A story presented to a user may describe an action taken by an additional user connected to the user and identifies the additional user or may take a variety of other forms, including sponsored stories, advertisements, postings by a page associated with a business, entity, or person the user is following, among other story types. In some embodiments, a story describing an action performed by a user may be accessible to users not connected to the user that performed the action. The newsfeed manager 230 generates stories for presentation to a user based on information in the action log 220 and in the edge store 225 or may select candidate stories included in the content store 210. One or more of the candidate stories are selected and presented to a user by the newsfeed manager 230.

For example, the newsfeed manager 230 receives a request to present one or more stories to a social networking system user. The newsfeed manager 230 accesses one or more of the user profile store 105, the content store 110, the action log 120, and the edge store 130 to retrieve information about the identified user. For example, stories, actions, or other data associated with users connected to the identified user are retrieved. The retrieved stories, actions, or other data are analyzed by the newsfeed manager 230 to identify content likely to be relevant to the identified user. For example, stories associated with users not connected to the identified user or stories associated with users for which the identified user has less than a threshold affinity are discarded as candidate stories. Based on various criteria, the newsfeed manager 230 selects one or more of the candidate stories for presentation to the identified user.

In operation, when determining whether a candidate story should be selected for presentation in a user's newsfeed, the newsfeed manager 230 computes a score for the story based on several features of the story. Examples of these features include the source of the story, the content included in the story, the edge relationships between the entity that posted the story and the user, the originality of the story relative to other stories that have previously been presented to the user, and the temporal relevance of the story. A more detailed discussion of determining the temporal relevance of a story is presented below.

When computing the score, the weight assigned to each of the features of the candidate story may vary depending on the type of the feature and also the relevance of the feature to the user. For example, the newsfeed manager 230 may account for actions by the user indicating a preference for types of stories when determining the weight of a particular feature. Once scores for the candidate stories have been computed, the newsfeed manager 230 selects the top scoring stories for presentation in the user's newsfeed.

In one embodiment, the newsfeed manager 230 also determines the order in which selected stories are presented via the newsfeed. For example, the newsfeed manager 230 determines that a user has a highest affinity for a specific user and increases the number of stories in the newsfeed associated with the specific user or modifies the positions in the newsfeed where stories associated with the specific user are presented.

Temporal Relevance of Newsfeed Stories

Stories to be presented in newsfeeds may become stale over time such that a story that was relevant and thus likely to be of interest to a user in a previous time period is no longer relevant in a current time period. To avoid presenting stale content to a user in the newsfeed, the newsfeed manager 230 accounts for the length of time that has elapsed since the content of the story was first available for presentation to the user. The newsfeed manager 230 also takes into account a level of interaction by users of the social networking system 140 with the story up until a current time. The length of time elapsed since the content of a story was first available for presentation and the level of interaction both provide indications as to whether the story is relevant in a current time period.

In operation, for each story to be presented to a user in the newsfeed, the newsfeed manager 230 transmits a request to the timeliness evaluator 235 to determine the temporal relevance of the story. The temporal relevance of a story indicates a likelihood of the story being relevant in a current time period. For example, a story that includes content related to a half-time score of a basketball game has a higher likelihood of being temporally relevant while the basketball game is in progress as opposed to after the game has concluded. In such an example, a story that includes content related to the final score of the basketball game has a higher likelihood of being temporally relevant than the story including content related to the half-time score.

The timeliness evaluator 235 computes the temporal relevance of a given story based on the interactions by users of the social networking system 140 with the story. As discussed above, users of the social networking system 140 interact with objects including stories, and these interactions are stored in the action log 220. Examples of interactions with stories include sharing a story, commenting on a story, clicking on a story (e.g., to open an article or page associated with the story), viewing a story, and expressing a preference for the story ("liking" the story).

For a given story, the timeliness evaluator 235 determines an expected engagement for the story given the length of time that has elapsed since the story was first available to be presented in the user's newsfeed. The timeliness evaluator 235 computes the expected engagement for a given unit of time based on the total number of interactions by users of the social networking system 140 with the identified story up until a current time. The given unit of time is configurable and may be an hour, a minute, a second, or any other time period. In one embodiment, the expected engagement indicates the average number of interactions with the identified story per unit of time, e.g., average number of interactions per minute or average number of interactions per hour.

The timeliness evaluator 235 also determines a current engagement for the story based on the interactions by users of the social networking system 140 with the story in the immediately prior unit of time. For example, if the expected interaction rate is determined per hour, then the current engagement is determined for the hour immediately prior to a current time. In another example, if the expected interaction rate is determined per minute, then the current engagement is determined for the minute immediately prior to a current time.

Each interaction with the story may be given a different weight when computing the expected or the current engagement. The weight given to a particular interaction may be determined based on the type of an interaction, where the type is an indicator of the quality of engagement by the user with the story. For example, the timeliness evaluator 235 may associate a higher weight with an interaction that involves a user sharing the story relative to an interaction that involves a user expressing a preference by 'liking' the story.

The timeliness evaluator 235 computes the temporal relevance of the story based on the current engagement and the expected engagement for the story. In one embodiment, the temporal relevance is the ratio between the current engagement and the expected engagement. In an alternate embodiment, the temporal relevance is the absolute difference between the current engagement and the expected engagement. The timeliness evaluator 235 transmits the computed temporal relevance of the story to the newsfeed manager 230.

The newsfeed manager 230 processes the temporal relevance of the story to determine whether the story should be selected for presentation to the user in the newsfeed. In one embodiment, the newsfeed manager 230 uses the temporal relevance of the story when computing the relevance score for the story. As discussed above, when determining whether the story should be selected for presentation in a user's newsfeed, the newsfeed manager 230 computes a score for the story based on several features of the story. The temporal relevance may be a feature of the story when computing the score. The newsfeed manager 230 may assign a weight to the temporal relevance that makes the temporal relevance a more or less significant feature in the computed score.

In an alternate embodiment, the newsfeed manager 230 uses the temporal relevance as an independent filter when determining whether the story should be selected for presentation in a user's newsfeed. In such an embodiment, when the temporal relevance is above a threshold, the newsfeed manager 230 determines that the story should be selected for presentation in the user's newsfeed unless the score of the relevance story prevents the story from being selected. Alternatively, when the temporal relevance is below a threshold, the newsfeed manager 230 determines that the story should not be selected for presentation in the user's newsfeed regardless of the relevance score of the story.

In another embodiment, the newsfeed manager 230 uses the temporal relevance to modify a decay factor associated with the story that indicates the rate at which the story is expected to lose relevance. The newsfeed manager 230 applies the decay factor to the score of the story when determining whether the story should be presented in a user's newsfeed. In some cases, the temporal relevance is higher than a threshold temporal relevance while the decay factor, when applied to the score, reduces the score such that the story is not selected for presentation. In such cases, the newsfeed manager 230 modifies the decay factor to reduce the rate at which the story is expected to lose relevance. The amount by which the rate is reduced may depend on the temporal relevance of the story. For example, the rate may be reduced by an amount proportional to the difference between the temporal relevance of the story and the threshold temporal relevance. Similarly, in other cases, the temporal relevance is lower than a threshold temporal relevance while the decay factor, when applied to the score, increases the score such that the story is selected for presentation. In such cases, the newsfeed manager 230 modifies the decay factor to increase the rate at which the story is expected to lose relevance. The amount by which the rate is increases may also depend on the temporal relevance of the story.

Figure 3:
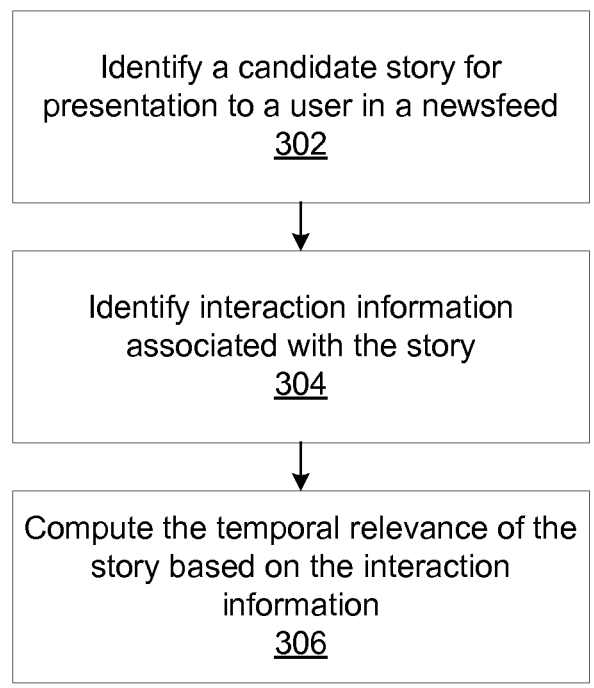
FIG. 3 is a flowchart of steps for determining the temporal relevance of a newsfeed story in accordance with an embodiment of the invention.

FIG. 3 is a flowchart of steps for determining the temporal relevance of a newsfeed story in accordance with an embodiment of the invention. In some implementations, the steps are performed in an order other than the order presented in FIG. 3. Different and/or additional steps than those shown in FIG. 3 may be performed in some embodiments.

The newsfeed manager 230 identifies 302 a candidate story for presentation to a user in a newsfeed. The story may include content from the content store 210 and/or actions by users of the social networking system 140 stored in the action log 220. The timeliness evaluator 235 identifies 304 interaction information associated with the candidate story. The interaction information identifies various interactions by users of the social networking system 140 with the story. These interactions include sharing the story, commenting on the story, expressing a preference for the story, clicking on a story, viewing a story, etc. In one embodiment, the interactions are identified based on the actions stored in the action log 220 that are associated with the story.

The timeliness evaluator 235 computes 306 a temporal relevance of the candidate story based on the identified interaction information. The temporal relevance indicates a likelihood of the story being relevant in a current time period. In one embodiment, the timeliness evaluator 235 computes the temporal relevance as a ratio between a current engagement computed based on the identified interaction information and an expected engagement for the story.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method, comprising:
receiving one or more candidate stories for presentation in newsfeeds for a plurality of users of a social networking system;
identifying a subset of candidate stories from the one or more candidate stories, the identified subset of candidate stories eligible for presentation in a newsfeed for a user of a social networking system; and
applying a filter to the subset of candidate stories to select one or more stories for inclusion in the newsfeed, wherein applying the filter comprises, for each candidate story in the subset of candidate stories:
 determining a measure of expected engagement associated with the candidate story based on a rate at which the plurality of users of the social networking system have interacted with the candidate story since the candidate story was available for presentation in the social networking system,
 determining a measure of current engagement associated with the candidate story based on the rate at which the plurality of users of the social networking systems have interacted with the candidate story in a current time period,
 computing a temporal relevance of the candidate story based on a comparison between the measure of expected engagement and the measure of current engagement, the temporal relevance indicating a likelihood that the candidate story is relevant to the user in the current time period,
 determining a decay factor for the candidate story based on the computed temporal relevance, the decay factor indicating a rate at which the candidate story loses relevance,
 determining a relevance score for the candidate story based on the determined decay factor,
 responsive to determining that the relevance score is greater than a threshold value, selecting the candidate story for presentation in the newsfeed.

2. The method of claim 1, wherein determining the measure of current engagement comprises:
identifying a plurality of interactions between one or more users of the social networking system and the candidate story;
weighting each of the plurality of interactions based on a type of interaction; and
combining the weighted plurality of interactions to determine the measure of current engagement.

3. The method of claim 1, wherein the measure of expected engagement is for a given unit of time, and the current time period is the unit of time that most recently elapsed.

4. The method of claim 1, further comprising computing the temporal relevance based on a ratio of the measure of expected engagement and the measure of current engagement.

5. The method of claim 1, further comprising computing the temporal relevance based on a difference between the measure of expected engagement and the measure of current engagement.

6. The method of claim 1, wherein determining whether to select the candidate story comprises computing a relevance score for the candidate story based on a combination of the temporal relevance and one or more other features of the candidate story.

7. A non-transitory computer-readable storage medium containing computer program code for:

receiving one or more candidate stories for presentation in newsfeeds for a plurality of users of a social networking system;

identifying a subset of candidate stories the one or more candidate stories, the identified subset of candidate stories eligible for presentation in a newsfeed for a user of a social networking system; and applying a filter to the subset of candidate stories to select one or more stories for inclusion in the newsfeed, wherein applying the filter comprises, for each candidate story in the subset of candidate stories:

determining a measure of expected engagement associated with the candidate story based on a rate at which the plurality of users of the social networking system have interacted with the candidate story since the candidate story was available for presentation in the social networking system, determining a measure of current engagement associated with the candidate story based on a rate at which the plurality of users of the social networking systems have interacted with the candidate story in a current time period, computing a temporal relevance of the candidate story based on a comparison between the measure of expected engagement and the measure of current engagement, the temporal relevance indicating a likelihood that the candidate story is relevant to the user in the current time period, determining a decay factor for the candidate story based on the computed temporal relevance, the decay factor indicating a rate at which the candidate story loses relevance, determining a relevance score for the candidate story based on the determined decay factor, and responsive to determining that relevance score is greater than a threshold value, selecting the candidate story for presentation in the newsfeed.

8. The non-transitory computer-readable storage medium of claim 7, wherein code for determining the measure of current engagement comprises code for:

identifying a plurality of interactions between one or more users of the social networking system and the candidate story;

weighting each of the plurality of interactions based on a type of interaction; and combining the weighted plurality of interactions to determine the measure of current engagement.

9. The non-transitory computer-readable storage medium of claim 7, wherein the measure of expected engagement is for a given unit of time, and the current time period is the unit of time that most recently elapsed.

10. The non-transitory computer-readable storage medium of claim 7, further comprising code for computing the temporal relevance based on a ratio of the measure of expected engagement and the measure of current engagement.

11. The non-transitory computer-readable storage medium of claim 7, further comprising code for computing the temporal relevance based on a difference between the measure of expected engagement and the measure of current engagement.

12. The non-transitory computer-readable storage medium of claim 7, wherein determining whether to select the candidate story comprises computing a relevance score for the candidate story based on a combination of the temporal relevance and one or more other features of the candidate story.

13. The method of claim 1, wherein computing a temporal relevance further comprises:

determining a length of time elapsed since the candidate story was first made available to the user;

determining a level of interaction with the candidate story since the candidate story was first made available to the user; and determining the temporal relevance based on the length of time elapsed since the candidate story was first made available to the user and the level of interaction with the candidate story since the candidate story was first made available to the user.

14. The non-transitory computer readable storage medium of claim 7, wherein code for computing a temporal relevance comprises code for:

determining a length of time elapsed since the candidate story was first made available to the user;

determining a level of interaction with the candidate story since the candidate story was first made available to the user; and determining the temporal relevance based on the length of time elapsed since the candidate story was first made available to the user and the level of interaction with the candidate story since the candidate story was first made available to the user.

15. A computer system comprising:

one or more processors;

a non-transitory computer-readable storage medium storing computer program code for:

receiving one or more candidate stories for presentation in newsfeeds for a plurality of users of a social networking system;

identifying a subset of candidate stories from the one or more candidate stories, the identified subset of candidate stories eligible for presentation in a newsfeed for a user of a social networking system; and applying a filter to the subset of candidate stories to select one or more stories for inclusion in the newsfeed, wherein applying the filter comprises, for each candidate story in the subset of candidate stories:

determining a measure of expected engagement associated with the candidate story based on a rate at which the plurality of users of the social networking system have interacted with the candidate story since the candidate story was available for presentation in the social networking system, determining a measure of current engagement associated with the candidate story based on a rate at which the plurality of users of the social networking systems have interacted with the candidate story in a current time period, computing a temporal relevance of the candidate story based on a comparison between the measure of expected engagement and the measure of current engagement, the temporal relevance indicating a likelihood that the candidate story is relevant to the user in the current time period, determining a decay factor for the candidate story based on the computed temporal relevance, the decay factor indicating a rate at which the candidate story loses relevance;

determining a relevance score for the candidate story based on the determined decay factor, and responsive to determining that the relevance score is greater than a threshold value, selecting the candidate story for presentation in the newsfeed.

16. The computer system of claim 15, wherein code for determining the measure of current engagement comprises code for:
   identifying a plurality of interactions between one or more users of the social networking system and the candidate story;
   weighting each of the plurality of interactions based on a type of interaction; and
   combining the weighted plurality of interactions to determine the measure of current engagement.

17. The computer system of claim 15, wherein the measure of expected engagement is for a given unit of time, and the current time period is the unit of time that most recently elapsed.

18. The computer system of claim 15, wherein the non-transitory storage medium further comprises code for computing the temporal relevance based on a ratio of the measure of expected engagement and the measure of current engagement.

\* \* \* \* \*

UNITED STATES PATENT AND TRADEMARK OFFICE
CERTIFICATE OF CORRECTION

PATENT NO. : 10,063,513 B2
APPLICATION NO. : 14/535308
DATED : August 28, 2018
INVENTOR(S) : Erich James Owens and David Vickrey It is certified that error appears in the above-identified patent and that said Letters Patent is hereby corrected as shown below:

In the Claims

Column 11, Claim 7, Line 4, after "stories", insert --from--

Signed and Sealed this
Twenty-sixth Day of February, 2019

Andrei Iancu
*Director of the United States Patent and Trademark Office*